United States Patent
Hsieh et al.

[11] Patent Number: 5,966,406
[45] Date of Patent: Oct. 12, 1999

[54] METHOD AND APPARATUS FOR NOISE BURST DETECTION IN SIGNAL PROCESSORS

[75] Inventors: Chau-Kai Hsieh; Hsin-Mei Chen, both of Hsinchu Hsieh, Taiwan

[73] Assignee: Windbond Electronics Corp., Hsinchu, Taiwan

[21] Appl. No.: 08/815,849

[22] Filed: Mar. 12, 1997

[30] Foreign Application Priority Data

Dec. 30, 1996 [TW] Taiwan ................................. 85220326

[51] Int. Cl.$^6$ ....................................................... H04B 3/46
[52] U.S. Cl. ......................... 375/225; 375/227; 375/334; 714/704; 329/303
[58] Field of Search ..................................... 375/224, 225, 375/227, 334, 335, 344, 351; 455/222, 227; 364/724.06, 724.08; 329/300, 318, 303, 5.1

[56] References Cited

U.S. PATENT DOCUMENTS

| | | | |
|---|---|---|---|
| 4,479,092 | 10/1984 | Falconer | 329/145 |
| 5,007,032 | 4/1991 | Jensen | 367/136 |
| 5,317,522 | 5/1994 | Bonet et al. | 364/514 |
| 5,319,573 | 6/1994 | Corleto et al. | |

*Primary Examiner*—Amanda T. Le
*Attorney, Agent, or Firm*—Finnegan, Henderson, Farabow, Garrett & Dunner, L.L.P.

[57] ABSTRACT

A method and apparatus for noise burst detection in a signal processor is provided. The method and apparatus is based on the zero-crossing rate (ZCR) of the received signal, which is defined as the number of times the magnitude of the received signal becomes zero during a specific counting period, to determine whether the received signal is a noise or a normal signal. The received signal is sampled at a specified sampling rate. Whether the signal waveform undergoes a zero-crossing is determined by comparing the polarity of the current sampled magnitude with that of the previous one. If the polarities are different, it indicates that the signal waveform has undergone a zero-crossing during the current sampling period; otherwise, it indicates that the signal waveform has not undergone a zero-crossing. The count of zero-crossing during each counting period is compared with a preset threshold value. If the count is larger than the threshold value, it indicates the received signal is noise; otherwise, the received signal is a normal signal.

20 Claims, 2 Drawing Sheets

METHOD AND APPARATUS FOR NOISE BURST DETECTION IN SIGNAL PROCESSORS

BACKGROUND OF THE INVENTION

1. Field of the Invention

This invention relates to signal processors, and more particularly, to a method and apparatus for noise burst detection in signal processors.

2. Description of Related Art

Thanks to the advances in semiconductor technologies, many electronic devices, such as digital cordless telephones, can be now made compact but nonetheless provide an increased level of functionality with high integration and low cost. The digital cordless telephone includes a handset which is provided with a microphone for receiving and converting a human voice into an analog speech signal. The analog speech signal is subsequently converted into digital form which is compressed and then modulated into a radio frequency (RF) signal for transmission by means of an antenna through the ether to a nearby base station. The base station serves as a relay to retransmit the RF signal to the destination telephone set. Upon receiving the RF signal, the circuitry in the destination telephone set first demodulates the RF signal into digital form, then decompresses the digital data, converts the digital data into analog form, and finally broadcasts the analog signal (which represents the original voice of the caller) on a speaker on the destination telephone set.

The UK (United Kingdom) Cordless-Telephone Second Generation CT-2, for example, sets forth a standard for cordless telephone communications. In compliance with the CT-2 standard, the handset on the caller's site will process the analog speech signal generated by the microphone by means of the so-called Adaptive Differential Pulse Code Modulation (ADPCM) encoder for pulse code modulation (PCM) of the analog speech signal into digital form, and then transmit the modulated signal via the so-called Common Air Interface (CAI) to the base station.

The handset and the base station are continuously linked until the communication therebetween is over. In some circumstances, for instance when the handset is moved beyond the reception range of the base range, the link is broken. When this happens, high volume white noise will be output to the speaker. This noisy broadcast of the white noise is usually annoying to the user. The speaker will be muted only until the handset detects that the link is disconnected. To detect whether the link is connected or disconnected, the CT-2 standard sets forth a so-called "shake-hand" signal which is embedded in the transmitted signal for the handset to determine whether the link is still connected. One drawback to this solution, however, is that the interval of the shake-hand signal will last for several seconds, which is quite a long duration for the user to tolerate the noisy broadcast from the speaker on the handset. A conventional solution can reduce the interval of the shake-hand signal down to some hundreds of milliseconds (ms). However, users still consider this period too long to tolerate the noisy broadcast from the speaker on the handset when the link is broken.

Various noise burst detection techniques have been proposed for use on digital signal systems, such as the above-mentioned ADPCM-based digital communication system, for quick detection of the appearance of noise burst to thereby prevent them from being broadcast on the speaker on the handset. Conventional noise burst detection techniques include, for example, the U.S. Pat. No. 5,317,522 to Bonnet et al. and the U.S. Pat. No. 5,319,573 to Corleto et al., which are particularly used on ADPCM encoders to detect noise burst and, in the event of the occurrence of a noise burst, shut off the speaker so as to mute the noise.

However, it is a drawback of these two patents that, since multiplexers and accumulators are required for signal processing to determine whether the received signal is noise or a normal signal, the hardware is very complex. The manufacturing cost of the two patents is therefore high.

SUMMARY OF THE INVENTION

It is therefore a primary objective of the present invention to provide an apparatus for noise burst detection in signal processors which can be constructed with a low hardware complexity so as to reduce manufacturing costs.

It is a further objective of the present invention to provide a method for noise burst detection in signal processors which utilizes the zero-crossing rate to determine whether the received signal is noise or not.

In accordance with the foregoing and other objectives of the present invention, a new and improved method and apparatus for noise burst detection in signal processors is provided.

In the method of the invention, the first step is to continuously receive a signal and sample the received signal at a specific sample period. The second step is to detect the zero-crossing rate of the received signal within a counting period. The zero-crossing rate is obtained by dividing the count of zero-crossing during the current counting period by the length of the counting period. The final third step is to determine whether the received signal is noise by determining whether the zero-crossing rate is greater than a preset threshold value. If YES, it indicates that the received signal is noise; otherwise, the received signal is normal.

The apparatus of the invention includes a first buffer means for receiving a digital signal to thereby generate a first signal which is a delayed version of the digital signal, and a second buffer means for receiving the first signal to thereby generate a second signal which is a delayed version of the first signal. An exclusive-OR operator is used to perform an exclusive-OR operation on the first and second signals. A third buffer mans is used to receive the output of the exclusive-OR means to thereby generate a third signal that is representative of the result of the XOR operation on the first and second signals. A timer is used to generate a series of counter control signals at a specified counting rate. Further, a counter is coupled to the third buffer means and the timer means. The counter adds one to its count when the third signal is in a first logic state and maintains the count at the current value when the third signal is in a second logic state.

Upon each appearance of the control signal, the counter means transfers the current count as an output indicative of the zero-crossing rate of the received digital signal and then resets the count to a base value. Finally, a comparator is used to compare the output zero-crossing rate from the counter means with a preset threshold value. If the value of the zero-crossing rate is greater than the preset threshold value, the comparator means will output an indication signal indicating that the received signal is noise.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENT

The method and apparatus of the invention for noise burst detection is based on the zero-crossing rate (ZCR) of the received signal. The zero-crossing rate is defined as the number of times the magnitude of the received signal becomes zero during a specific period of time (hereinafter referred to as a counting period). In accordance with the invention, the received signal is sampled at a specific sampling rate. Whether the signal waveform undergoes a zero-crossing can be determined by comparing the polarity of the current sampled magnitude with that of the previous one.

If the polarities are different (one is positive and the other is minus), it indicates that the signal waveform has undergone a zero-crossing during the sampling period; otherwise, if the polarities are the same (both are positive or both are negative), it indicates that the signal waveform has not undergone a zero-crossing during the sampling period. The concept of using the zero-crossing rate for noise burst detection is further depicted in greater detail in the following with reference to FIG. 1.

Figure 1:
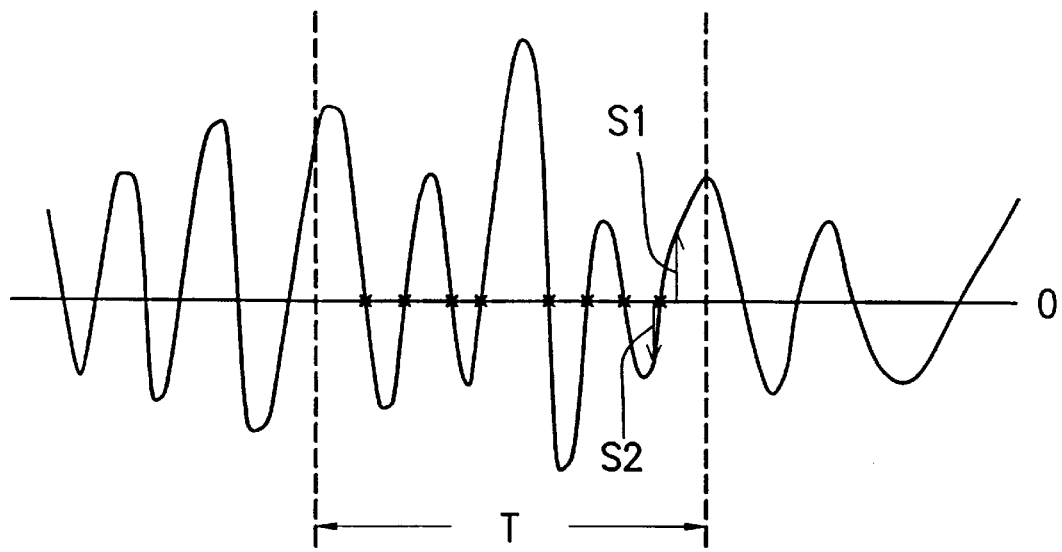
FIG. 1 is a graph used to depict the concept of the zero-crossing rate (ZCR) of a received signal.

Referring to FIG. 1, a graph is used to depict the zero-crossing rate of a received signal. The zero-crossing rate is defined as the number of times the signal waveform during has crossed the zero axis during a given counting period T. Assume that T=10 ms (millisecond). It can be seen from the graph that, during the counting period T, the number of times the signal waveform shown here becomes zero in magnitude is eight, as indicated by the "x" marks in FIG. 1. Therefore, the zero-crossing rate ZCR of the received signal is as follows:

ZCR=8 (times) / 10 ms=800 Hz (hertz).

In accordance with the invention, whether the signal waveform undergoes a zero-crossing is determined by comparing the polarity of the current sampled magnitude with that of the previous one. If the polarities are different (one is positive and the other is minus), it indicates that the signal waveform has undergone a zero-crossing during the current sampling period.

For instance, as depicted in FIG. 1, if the current sampled magnitude S1 of the received signal is positive and the previous one S2 is negative, it indicates that the signal waveform has crossed the zero axis at least once during the current sampling period. The total number of times the signal waveform has crossed the zero axis during the counting period T is recorded, by, perhaps, a counter.

Method of the Invention

Figure 2:
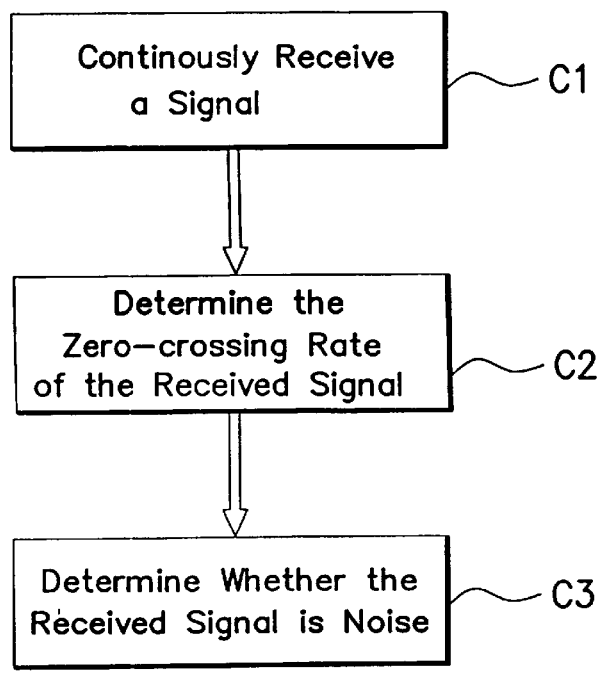
FIG. 2 is a flow diagram depicting the procedural steps involved in the method according to the present invention for noise burst detection.

Referring to FIG. 2, there is shown a flow diagram depicts the procedural steps involved in the method according to the present invention for noise burst detection in a signal processor. This flow diagram includes three steps.

The first step C1 is to continuously receive a digital signal, such as a linear PCM signal or an ADPCM-encoded audio signal. If the received signal is an ADPCM-encoded audio signal, it should be further decoded into a linear PCM signal. The received signal is further sampled at a specific sampling rate. The polarity of each sampled magnitude is recorded.

The subsequent step C2 is to count the total number of times N the waveform of the received signal has crossed the time axis during one counting period T, for example 10 ms. This is achieved by comparing the polarity of the current sampled magnitude with that of the previous one. If the polarities are different (one is positive and the other is minus), it indicates that the signal waveform has undergone a zero-crossing during the current sampling period. Each occurrence of zero-crossing is recorded and added to a count.

The total number of times N the signal waveform has crossed the zero axis during the counting period T is recorded. The zero-crossing rate ZCR can then be obtained as follows:

ZCR=N/T

The final step C3 is to compare the value of ZCR with a preset threshold value so as to determine whether the received signal is noise. If the value of ZCR is greater than the threshold value, it indicates that the received signal is noise; otherwise, it indicates that the received signal is a normal signal.

The frequency range of speech signals is normally below 4 kHz (kilohertz), which means that an speech signal will roughly have a zero-crossing rate of below 4 kHz. Since the frequency of noise is normally higher than 4 kHz, the threshold value can be accordingly set, for example, at 400 when the counting period is set at 10 ms in order to distinguishing between noise and a normal signal.

Apparatus of the Invention

Figure 3:
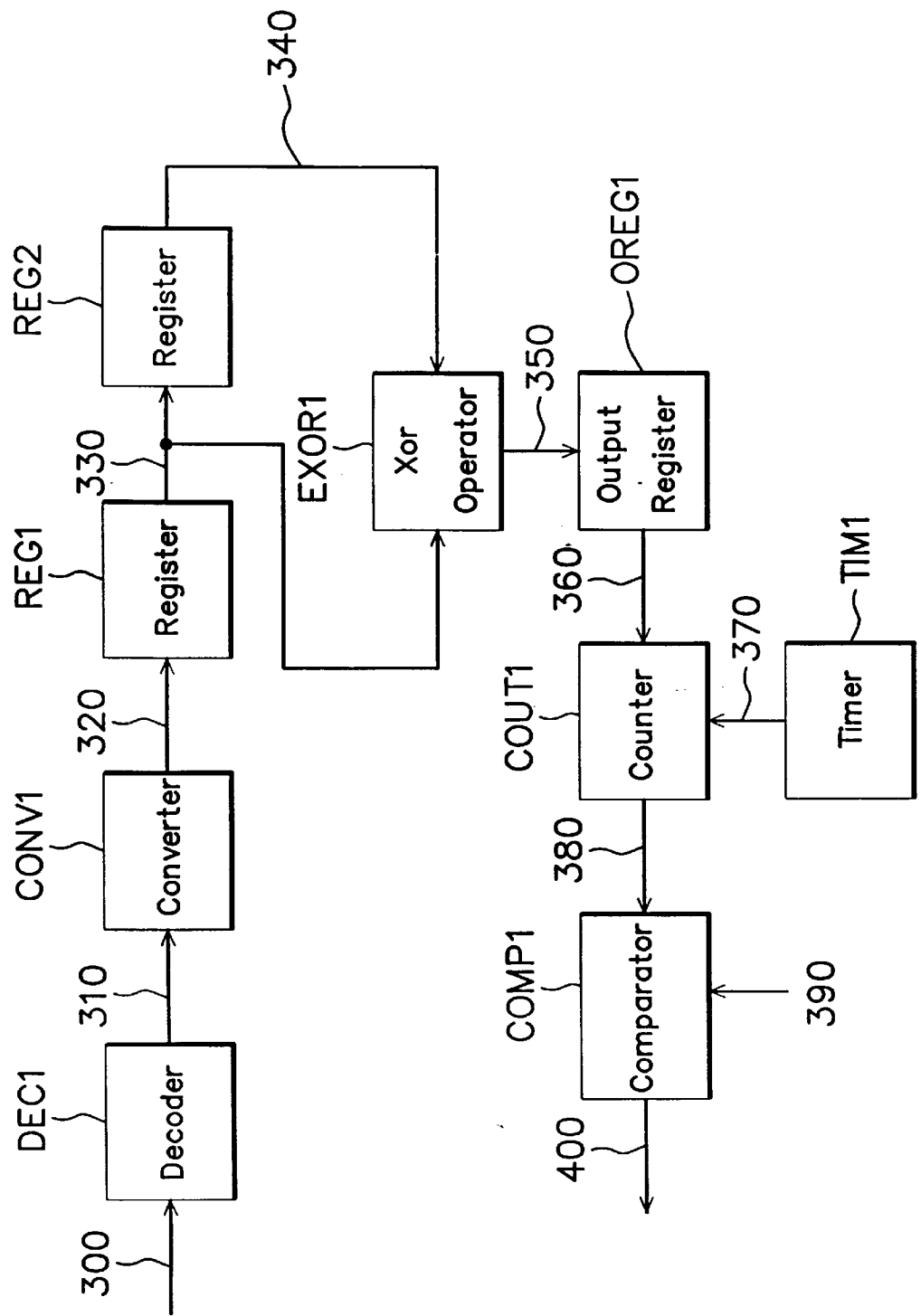
FIG. 3 is a schematic block diagram of the apparatus according to the present invention for noise burst detection.

Referring to FIG. 3, a schematic block diagram of the apparatus according to the present invention for noise burst detection in a signal processor, is shown. The apparatus includes a decoder DEC1, a converter CONV1, a first register REG1, a second register REG2, an XOR (exclusive-OR) operator EXOR1, an output register OREG1, a counter COUT1, a timer TIM1, and a comparator COMP1.

The decoder DEC1 is, for example, an ADPCM decoder, used to receive and decode an encoded signal 300, such as an ADPCM-encoded audio signal, to thereby output a logarithm PCM signal 310. Subsequently, the converter CONV1 converts the logarithm PCM signal 310 into a linear PCM signal 320. This completes the initial decoding process for the received signal.

The first and second registers REG1, REG2 serve as buffers to delay the output of the converter CONV1, i.e., the linear PCM signal 320, by a clock pulse. The first register REG1 receives the linear PCM signal 320 from the converter CONV1 and outputs a first signal 330 which is a delayed version of the linear PCM signal 320 by one clock signal; and the second register REG2 receives the first signal 330 from the first register REG1 and outputs a second signal 340 which is a delayed version of the first signal 330 by one clock signal. The first signal 330 can be expressed by S(t) which represents the current sampled magnitude of the received signal, while the second signal 340 can be expressed by S(t-1) which represents the previous sampled magnitude of the same.

The first and second signals 330, 340 are both fed to the XOR operator EXOR1 to undergo an XOR operation. The XOR operator EXOR1 then generates an output 350 which represents the result of the XOR operation on the first and second signals 330, 340. The result of the XOR operation indicates whether the current sampled magnitude of the received signal is the same polarity as the previous sampled magnitude of the same received signal. The output 350 of the XOR operator EXOR1 is subsequently fed to the output register OREG1. In response to the output 350 of the XOR operator EXOR1, the output register OREG1 generates a third signal 360 which is the most significant bit (MSB) of the output 350 (i.e., the result of the XOR operation on the first and second signals 310, 320). The third signal 360 is used as a triggering signal to the counter COUT1. When the third signal 360 is a logic-1 signal, the counter COUT1 will add one to its count; otherwise, no action will be carried out and the count remains the same.

The timer TIM1 outputs a clock signal 370 at a fixed period equal to the above-mentioned counting period T to the counter COUT1. The counting period is set at 10 ms, for example. At each appearance of the clock signal 370, the counter COUT1 will output the current value of its count via the output 380 to the comparator COMP1 and then reset its count back to a base value, for example zero. The comparator COMP1 then compares the output 380 of the counter COUT1 with a preset threshold value 390 to thereby output an indication signal 400. If the output 380 of the counter COUT1 is greater than the threshold value 390, the indication signal 400 will be at a high voltage state indicating that the received signal is noise; otherwise, the indication signal 400 will be at a low voltage state indicating that the received signal is a normal signal.

In conclusion, the method and apparatus of the invention utilizes the concept of zero-crossing rate to determine whether the received signal is noise or a normal signal. If the received signal is noise, it can be detected in just 10 ms, which is significantly faster than that achieved by the prior art. The speaker will then be immediately muted so that the user will not be annoyed by the broadcast of the noisy sound from the speaker. Further, from FIG. 3, it can be seen that the apparatus of the invention does not require the use of multiplexers and accumulators to implement. The hardware structure is simple and thus the manufacturing cost thereof is low.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An apparatus for noise burst detection in a signal processor, a first buffer means for receiving a digital signal to generate a first signal which is a delayed version of said digital signal;

a second buffer means for receiving said first signal to generate a second signal which is a delayed version of said first signal;

an exclusive-OR means, taking said first and second signals as inputs, for performing an exclusive-OR operation on said first and second signals and producing an output;

a third buffer means for receiving the output of said exclusive-OR means to generate a third signal representing a result of the XOR operation on said first and second signals;

a timer means for generating a series of control signals at a specified counting period;

a counter means coupled to said third buffer means and said timer means, said counter means adding one to its count when said third signal is at a first logic state and maintaining the count at the current value when said third signal is at a second logic state, upon each appearance of said control signals from said timer means, said counter means transferring the current count as an output indicative of the zero-crossing rate of the received digital signal and then resetting the count to a base value; and a comparator means, coupled to said counter means, for comparing the output zero-crossing rate from said counter means with a preset threshold value, wherein, if the zero-crossing rate is greater than the preset threshold value, said comparator means exports an indication signal indicating that the received signal is noise.

2. The apparatus of claim 1, further comprising:

a decoder means for receiving and decoding an encoded signal into a decoded signal; and a converter means, coupled to said decoder means, for converting said decoded signal into digital form which is said digital signal received by said first buffer means.

3. The apparatus of claim 2, wherein said decoder means is an ADPCM decoder.

4. The apparatus of claim 3, wherein said encoded signal is an ADPCM-encoded audio signal.

5. The apparatus of claim 4, wherein said decoded signal is a logarithmic PCM signal.

6. The apparatus of claim 5, wherein said digital signal is a linear PCM signal.

7. The apparatus of claim 1, wherein said digital signal is a linear PCM signal.

8. The apparatus of claim 1 or 2, wherein said second signal lags said first signal by one sampling clock.

9. The apparatus of claim 1 or 2, wherein said third signal is a binary signal representative of the most significant bit (MSB) of the result of the XOR operation on said first and second signals.

10. The apparatus of claim 1 or 2, wherein said counting period is 10 ms.

11. A method for detecting noise burst in the signal processor, comprising the steps of:

receiving digital signal and generating a first signal which is a delayed version of the digital signal;

receiving the first signal and generating a second signal which is a delayed version of the first signal;

performing an exclusive-OR operation on the first and second signal and producing an output;

receiving the output and generating a third signal representing a result of the exclusive-OR operation on the first and second signals;

generating a series of control signals at a specified counting period;

identifying whether the third signal is at the first logic state or a second logic state and controlling a count based on the identification, transferring the count as a zero-crossing rate output of the received digital signal and resetting the count to a base value each time receiving the control signals; and comparing the zero-crossing rate output with a preset threshold value to determine whether the received signal is noise.

12. The method of claim 11, further comprising the steps of:

receiving and decoding an encoded signal into a decoded signal; and converting the decoded signal into digital form, that digital form being the digital signal.

13. The method of claim 12, wherein the encoded signal is decoded by an ADPCM decoder.

14. The method of claim 13, wherein the digital signal is ADPCM-encoded audio signal.

15. The method of claim 14, wherein the decoded signal is a logarithmic PCM signal.

16. The method of claim 15, wherein the digital signal comprises a linear PCM signal.

17. The method of claim 11, wherein the digital signal comprises a linear PCM signal.

18. The method of claim 11, wherein the second signal lags the first signal by one sampling clock.

19. The method of claim 11, wherein the third signal includes a binary signal representing a most significant bit of the output of the exclusive-OR operation on the first and second signals.

20. The method of claim 11, wherein the counting period is about 10 ms.

* * * * *